(12) United States Patent
Saito et al.

(10) Patent No.: US 6,236,132 B1
(45) Date of Patent: May 22, 2001

(54) RELUCTANCE TYPE MOTOR

(75) Inventors: Tomohiro Saito, Kariya; Hideji Yoshida, Hashima; Shinji Makita; Masami Fujitsuna, both of Kariya; Naohisa Mimura; Yoshiyuki Takabe, both of Kosai, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/506,732

(22) Filed: Feb. 18, 2000

(30) Foreign Application Priority Data

Feb. 24, 1999 (JP) .................................. 11-046464
Nov. 19, 1999 (JP) .................................. 11-329836

(51) Int. Cl.⁷ ...................................................... H02P 6/00
(52) U.S. Cl. ........................... 310/168; 310/254; 310/269; 318/701
(58) Field of Search ................................... 310/162, 165, 310/166, 168, 170, 254, 269; 318/701

(56) References Cited

U.S. PATENT DOCUMENTS

| 4,647,802 | 3/1987 | Koneeny | 310/49 R |
|---|---|---|---|
| 5,111,095 | * 5/1992 | Hendershot | 310/168 |
| 5,717,269 | * 2/1998 | Tang | 310/168 |
| 5,747,912 | * 5/1998 | Sakuma et al. | 310/261 |
| 5,777,416 | * 7/1998 | Kolomeitsev | 310/168 |
| 5,838,087 | * 11/1998 | Tang | 310/168 |

FOREIGN PATENT DOCUMENTS

| 63-283457 | 11/1988 | (JP) | H02K/37/02 |
|---|---|---|---|
| 1-318579 | 12/1989 | (JP) | H02K/29/00 |

OTHER PUBLICATIONS

Denki Gakkai Kenkyuukai Shiryou RM–96–1–5, Ohno et al. "Performance Characteristic of Switched Reluctance Motor", Published on Mar. 1, 1996.

* cited by examiner

Primary Examiner—Burt Mullins
(74) Attorney, Agent, or Firm—Pillsbury Winthrop LLP (57) ABSTRACT

In a q phase-reluctance type motor including a rotor having 2n rotor protrusions with an arc angle X°, a stator having 2m stator protrusions with an arc angle Y° and m pairs of exciting coils, each of the pairs of exciting coils is disposed around one of the stator protrusions spaced apart at 180° in mechanical angle, and the following conditions are met: $q \geq 5$, $X°, Y° > 360°/(n \times q)$, $X° + Y° = 180°/n - \alpha°$, where $\alpha°$ is a counter torque marginal angle which is larger than 0°.

6 Claims, 8 Drawing Sheets

—— WITH SLITS, TRAPEZOID
---- WITH SLITS, RECTANGLE
---- NO SLITS, RECTANGLE

RELUCTANCE TYPE MOTOR

CROSS REFERENCE TO RELATED APPLICATION

The present application is based on and claims priority from Japanese Patent Applications Hei 11-46464 filed Feb. 24, 1999, and Hei 11-329836 filed Nov. 19, 1999, the contents of which are incorporated herein by reference.

BACKGROUND OF THE INVENTION

1. Field of the Invention

The present invention relates to a multi-phase half-wave reluctance type electrical motor and a driving method therefor.

2. Description of the Related Art

A reluctance type motor is generally simple in structure and provides high output torque. However, it has been used in a limited field because of its high torque ripples.

JP-A-1-318579 proposes a method of reducing the torque ripples by increasing the number of poles. In such a method, phase current is switched on and off in an electrically tandem switching manner. However, the magnetic flux for generating output torque in the reluctance motor disclosed in the publication flows through portions of the stator that generate counter torque. This does not sufficiently reduce such torque ripples.

SUMMARY OF THE INVENTION

It is therefore an object of the present invention to provide an improved reluctance type motor which can reduce such counter torque in a simple structure.

According to a main feature of the invention, a multi-phase reluctance type motor including a rotor having 2n rotor protrusions with an arc angle $X°$, a stator having 2m of stator protrusions with an arc angle $Y°$ and m pairs of exciting coils. Each of the pairs of exciting coils is disposed around one of said stator protrusions spaced apart at 180° in mechanical angle, and the following conditions are necessary: $q \geq 5$, $X°$, $Y° > 360°/(n \times q)$, $X° + Y° = 180°/n - \alpha°$, where $\alpha°$ is a counter torque marginal angle which is larger than 0°.

According to another feature of the invention, at least the rotor protrusions or the stator protrusions of the above reluctance motor have a plurality of slits. As portions of the rotor protrusion and the stator protrusion overlapping with each other increase, magnetic flux flowing therethrough increases, so that a flat torque characteristic can be provided.

According to another feature of the invention, each of the stator protrusions has a wider base portion than other portions. As a result, magnetic saturation of the stator protrusion due to leakage flux from the sides of the stator protrusions can be reduced, thereby preventing reduction in the output torque at a latter part of the energizing period of the exciting-coils.

According to another feature of the invention, in a method of driving the reluctance type motor as stated above, the exciting coils are energized at a mechanical angle not larger than $\alpha°$ in advance of the rotor every $360°/(2n \times q)$ mechanical angle. As a result the exciting coils can be energized in a shorter time, the torque ripples can be reduced and the output torque can be increased.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT (First Embodiment)

Figure 1:
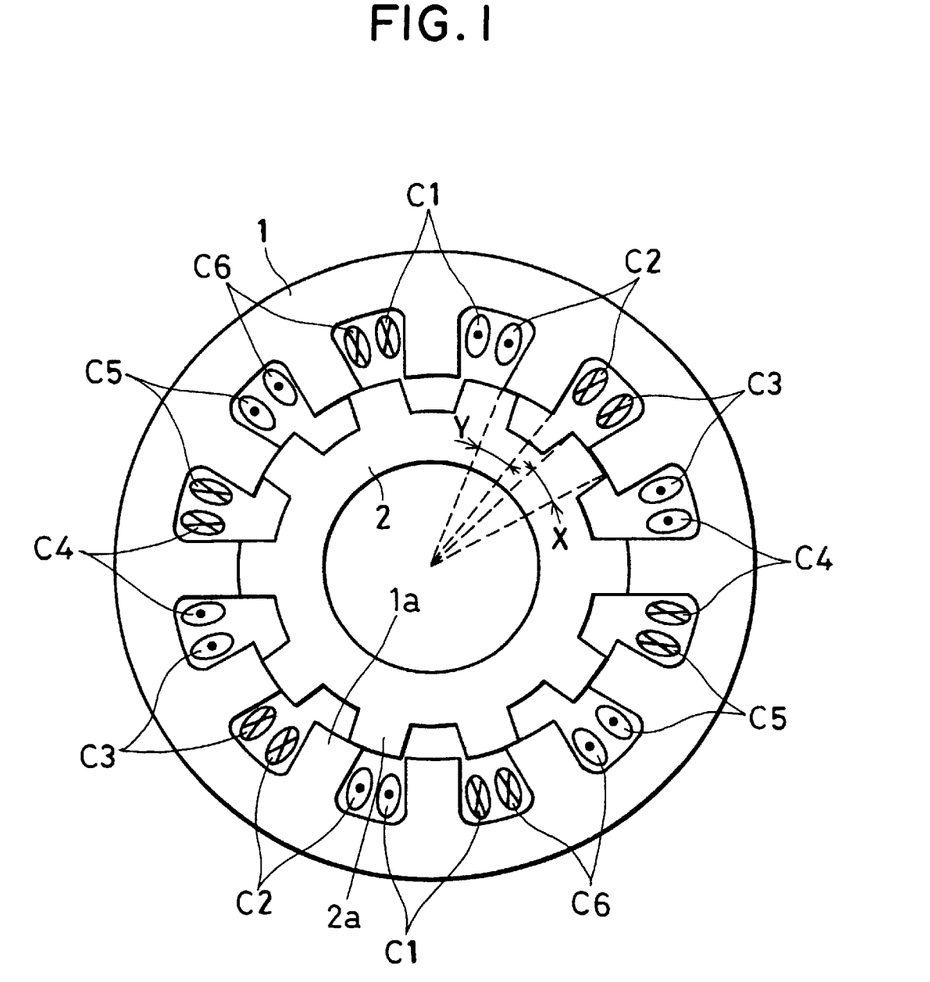
FIG. 1 is a schematic front view of a reluctance type motor according to a first embodiment of the present invention.

A reluctance type motor according to a first embodiment of the invention is described with reference to FIGS. 1–5A, and 5B. As shown in FIG. 1, the reluctance type motor is comprised of stator 1 having twelve stator protrusions 1a and rotor 2 having ten rotor protrusions 2a. Stator 1 also has six pairs of exciting coils C1–C6. Respective exciting coils of each pair are wound around a pair of protrusions 1a spaced apart at 180° in mechanical angle. Stator protrusion 1a and rotor protrusion 2a have the same arc length, which corresponds to rotor protrusion arc angle $X°$ and stator protrusion arc angle $Y°$, and equal to about 16°.

Figure 2A:
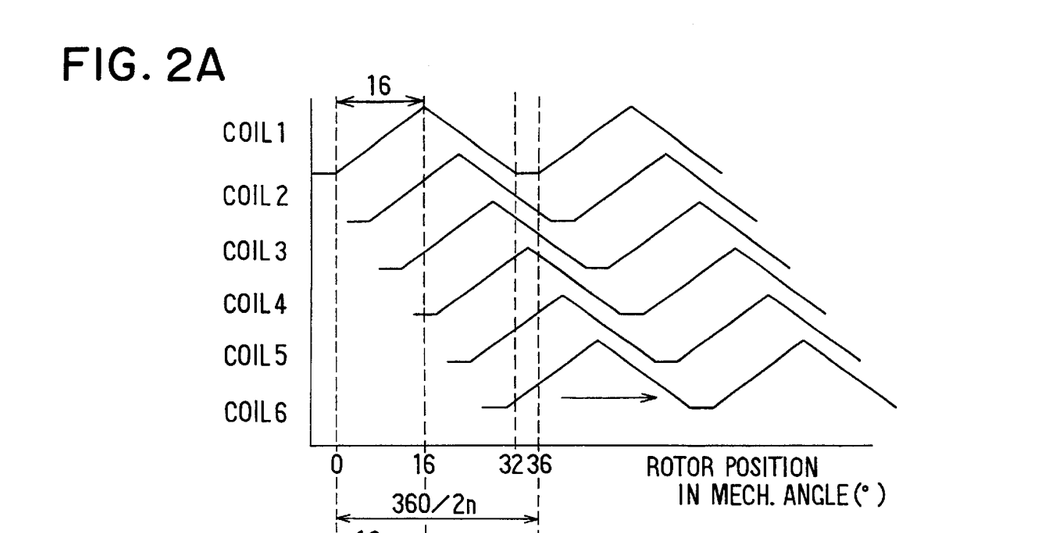
FIG. 2A is a graph showing inductance of respective phase coils.

If rotor 2 rotates within the inner periphery of stator 1, self inductance of each of coils C1–C6 changes from its minimum to its maximum in mechanical angle 16° and from its maximum to its minimum in mechanical angle 16° as shown in FIG. 2A.

It is found necessary that the stator protrusion and the rotor protrusion have to overlap with each other at a ratio more than 50% when they conduct magnetic flux, and the number q of the electric phases of the reluctance type motor according to this embodiment should be calculated as follows:

$q \geq 2m/$(the greatest common divisor between 2n and 2m)=5, where 2m is the number of stator protrusions that is 12, 2n is the number of rotor protrusions that is 10, and the greatest common divisor is 2.

In order to switch the exciting current from one to another, the smaller one of the protrusion arc angles X° and Y° should be double the switching interval or more. That is: X°, Y°≧360°/(n×q)

Exciting coils C1–C6 are sequentially energized in tandem at the following driving intervals:

360°/(2n×q)=6° (in mechanical angle).

Figure 2B:
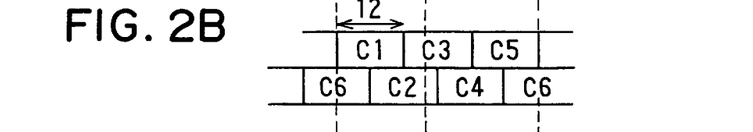
FIG. 2B is a graph showing timings of energizing the coils.
Figure 2C:
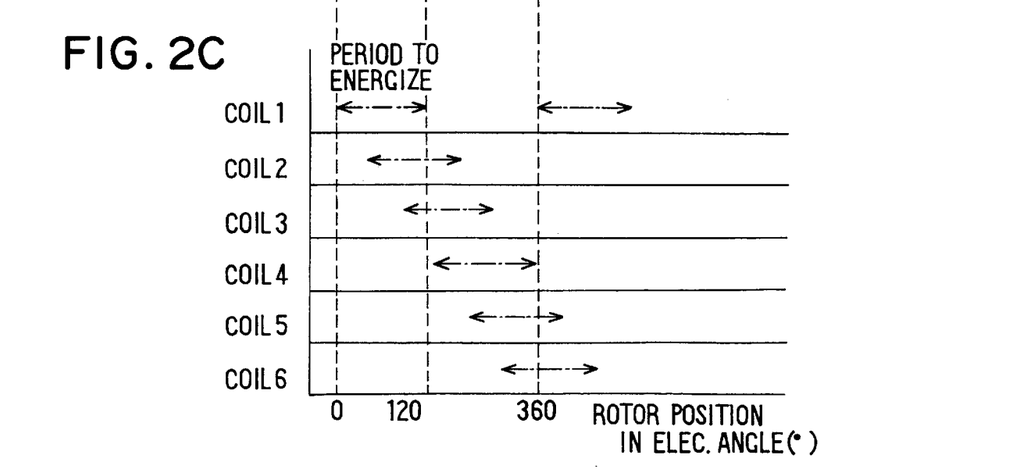
FIG. 2C is a graph showing periods of the respective phase coils to be energized.
Figure 5A:
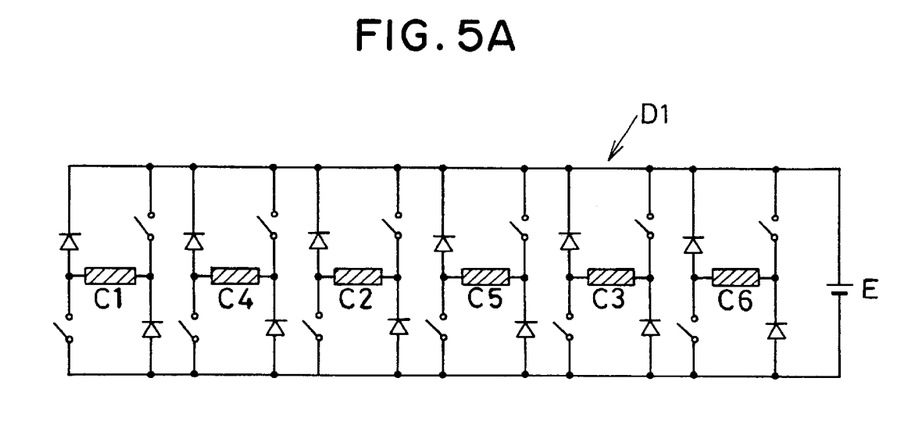
FIG. 5A is a circuit diagram of a separate-arm-type driver.
Figure 5B:
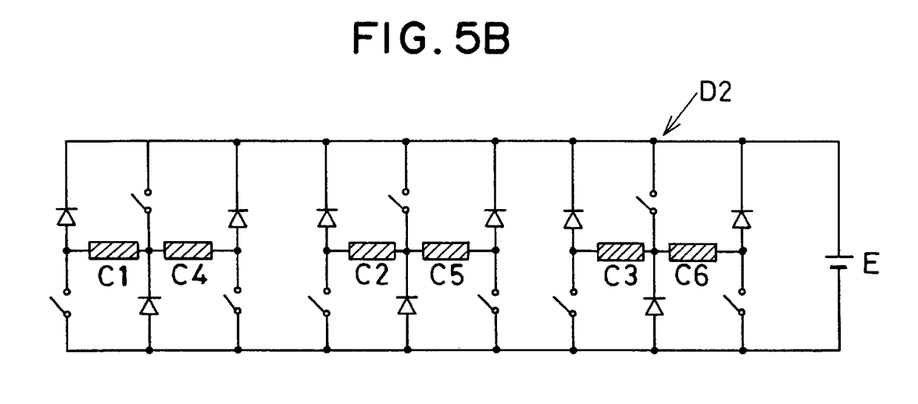
FIG. 5B is a circuit diagrams of a common arm type driver.

Output torque of the motor can be generated continuously if each of exciting coils C1–C6 is energized by a driver while rotor 2 rotates through 12° in mechanical angle, which is twice as long as the above energizing interval, as shown in FIG. 2B. Such a driver D1 or D2 is shown in FIG. 5A and FIG. 5B. Driver D1 is a separate arm type driver, and driver D2 is a common arm type driver.

The distance between adjacent rotor protrusions 2a is calculated as follows:

360°/2n−X°=36°−16°=20° (in mechanical angle)

Figure 3:
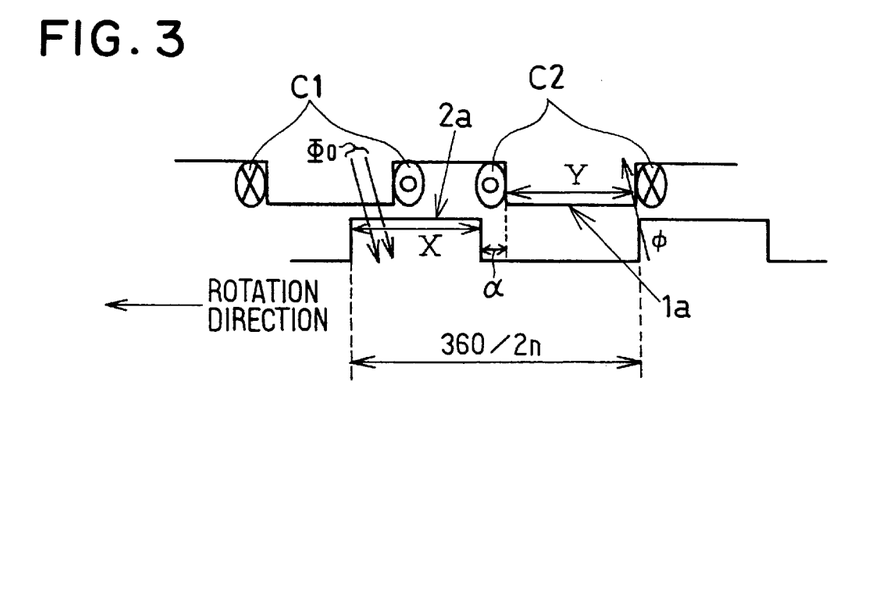
FIG. 3 is a schematic diagram showing relative position between the stator protrusion and the rotor protrusion.

FIG. 3 illustrates stator 1 and rotor 2 when coils C6 are switched off and coils C2 are switched on while coils C1 are already being energized as shown in FIG. 2B. In this instance, the rotor protrusion 2a is positioned in advance of the same stator protrusion 1a in the rotation direction. That is, the rear edge of rotor protrusion 2a is positioned in front of the front edge of stator protrusion 1a at a mechanical angle α°, while the rear edge of the same stator protrusion 1a and the front edge of the next rotor protrusion meet.

That is, α=(the arc angle between adjacent rotor protrusions 2a: 360°/2n−X°)−(the arc angle of the stator protrusion 1a: Y°), or X°+Y°=180°/n−α°

In this Embodiment, angle α°=20°−16°=4°. This angle is provided, as a counter torque marginal angle, to prevent leakage magnetic flux Φ1, which is a portion of magnetic flux Φm generated by coil C1, from leaking to coil C2 through rotor protrusion 2a, so that counter torque can be suppressed as shown in FIG. 4B.

Figure 4A:
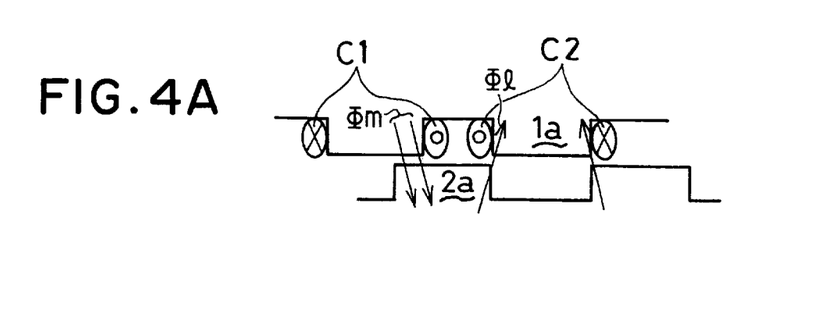
FIGS. 4A is a schematic diagram showing relative position between the stator protrusion and the rotor protrusion.
Figure 4B:
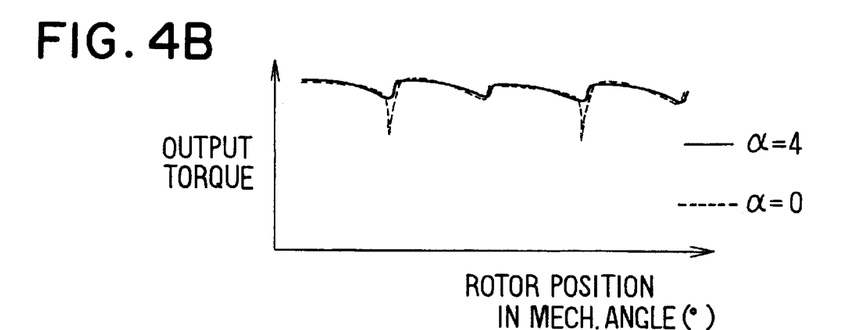
FIG. 4B is a schematic diagram showing output torque characteristic relative to the rotor position.

If the marginal angle α° is zero, as illustrated in FIG. 4A, the leakage magnetic flux Φ1 causes counter torque that reduces the output torque.

(Second Embodiment)

A reluctance type motor according to a second embodiment is described with reference to FIGS. 6A, 6B and 6C.

Figure 6A:
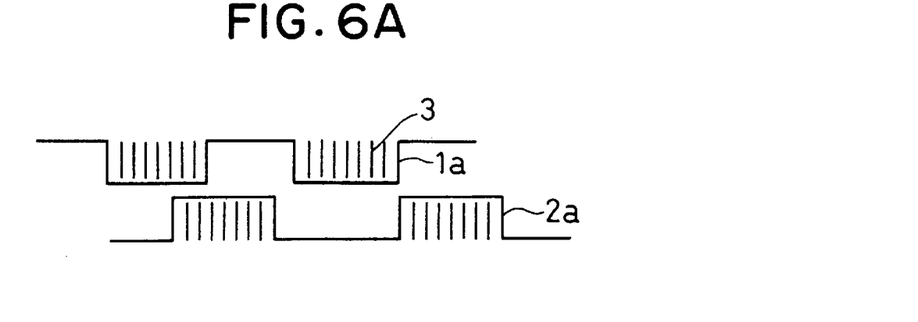
FIG. 6A is a schematic diagrams illustrating stator protrusions and rotor protrusions which have a plurality of slits thereon.
Figure 6B:
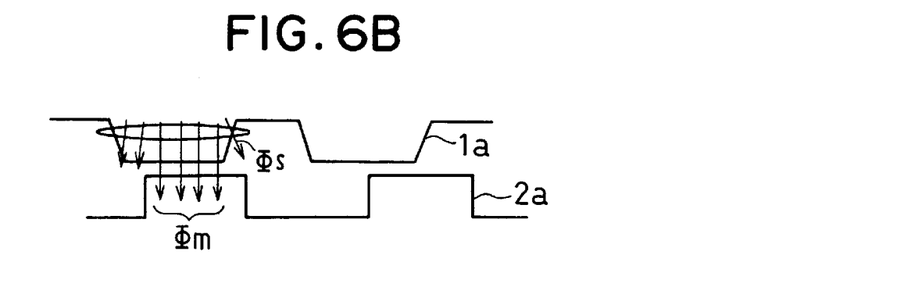
FIG. 6B is a schematic diagram illustrating a distribution of magnetic flux in the stator protrusions and the rotor protrusions.
Figure 6C:
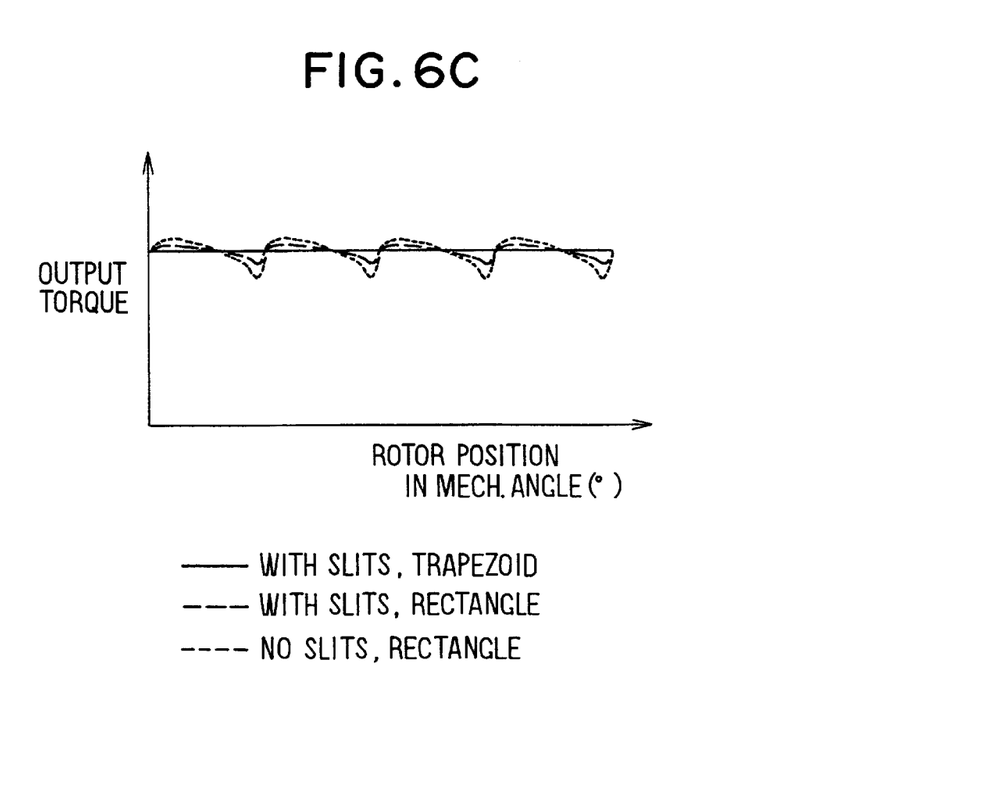
FIG. 6C is a graph showing the output torque relative to position of the rotor.

A plurality of radially extending grooves or slits 3 are formed in each of the stator and rotor protrusions 1a, 1b as shown in FIG. 6A. The grooves or slits 3 (hereinafter referred to slits) are effective to orient the magnetic flux Φm in the radial direction, so that the motor can provide a more flat output torque characteristic as indicated by a broken line in FIG. 6C than a motor without slits as indicated by a dotted line in FIG. 6C. The slits 3 can be formed only at ones of the stator protrusions 1a and rotor protrusions 2a.

Each of stator protrusions 1a may have the base portion that is wider than the inner edge (radially inner end). In other words, each of the stator protrusions 1a has a trapezoidal front shape as illustrated in FIG. 6B. This shape allows a portion of the magnetic flux to flow from the side surface thereof, thereby, to moderate the magnetic saturation. Accordingly, the output torque of those of coils C1–C6 is prevented from lowering during the latter part of the period in which they are energized. As a result, the motor having the slits can provide a more flat output torque characteristic than others, as indicated by a solid line in FIG. 6C.

(Third Embodiment)

A reluctance type motor according to a third embodiment is described with reference to FIGS. 7, 8A, 8B and 8C.

Figure 7:
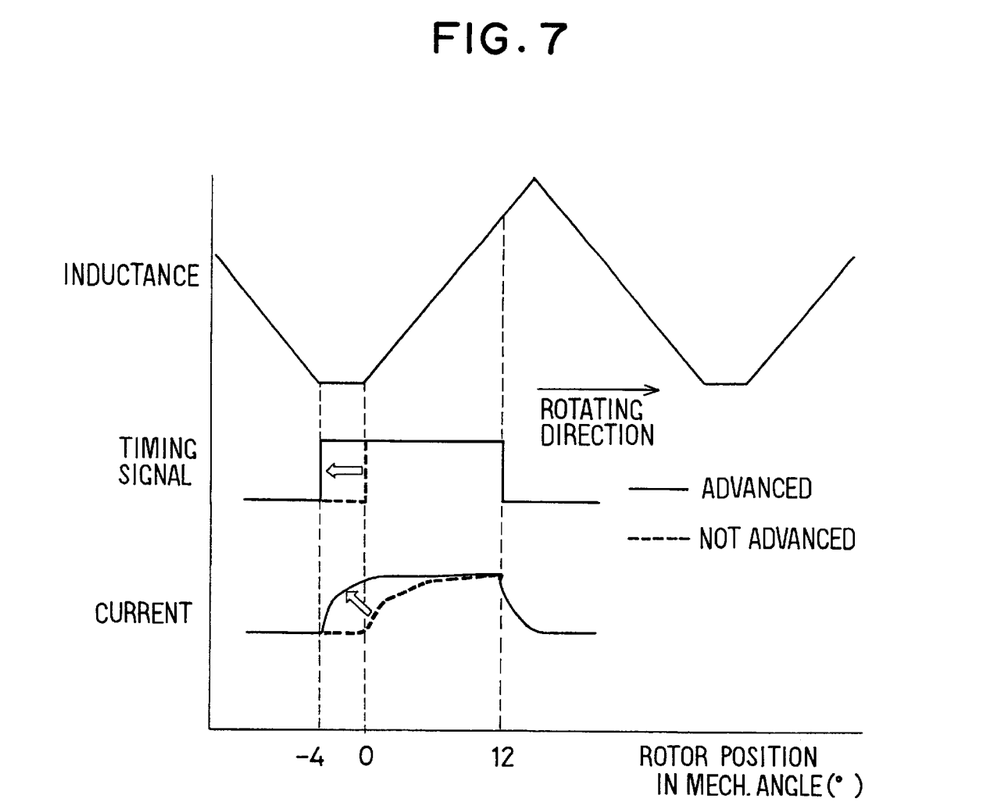
FIG. 7 is a chart showing inductance of an exciting coil, switching operation, and exciting current relative to the position of the rotor.

The exciting current can not be fully supplied to each of exciting coils C1–C6 until a certain delay time passes as indicated by a thick broken line in FIG. 7. This causes torque ripples and reduces the output torque.

Figures 8A, 8B:
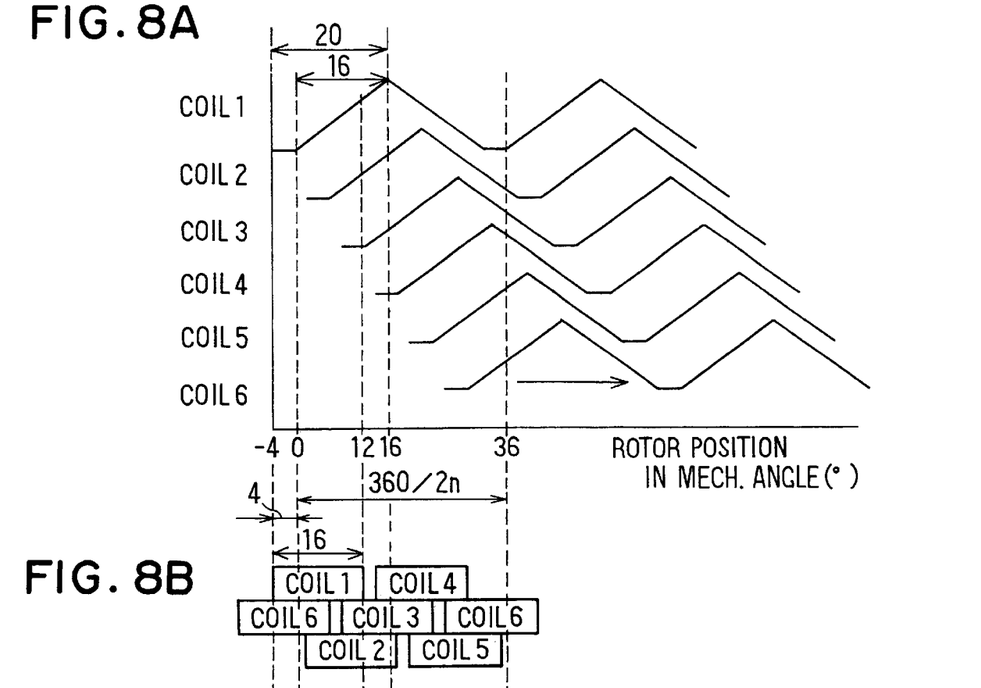
FIG. 8A is a graph showing inductance change of respective phase coils relative to the position of the rotor.
FIG. 8B is a graph showing timings of energizing the coils.
Figure 8C:
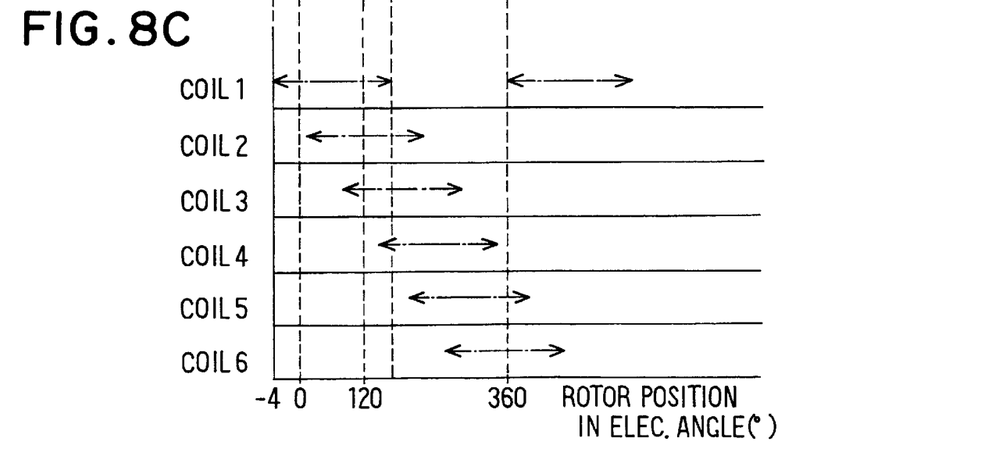
FIG. 8C is a graph showing energizing periods of the respective phase coils.

This delay can be reduced if the timing of the energizing is advanced a certain angle such as the marginal angle α° (e.g. 4°) because the advanced angle brings the exciting coil to the position where the inductance thereof is reduced when it is energized. The result is shown in FIGS. 8A, 8B and 8C.

Because an optimum advanced angle varies with the rotation speed, the advanced angle should be controlled according to the rotation speed.

(Fourth Embodiment)

Figure 9:
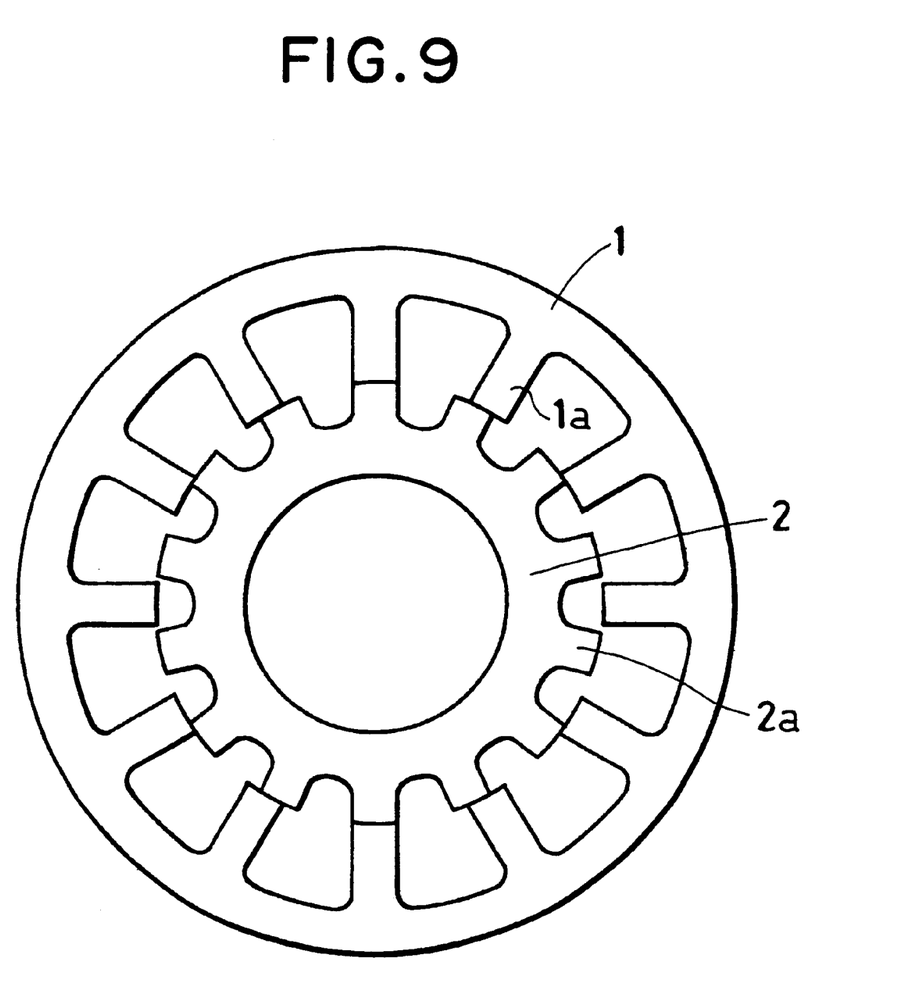
FIG. 9 is a schematic front view of a reluctance type motor according to a fourth embodiment of the present invention.

A reluctance type motor according to a fourth embodiment of the invention is described with reference to FIG. 9. Stator 1 has twelve protrusions 1a and rotor 2 has fourteen protrusions 2a. The protrusion arc angle of both stator protrusions and rotor protrusions is 10.3° in mechanical angle. The motor according to the fourth embodiment is operated in substantially the same manner as the previous embodiments.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A q-phase reluctance type motor comprising:

a rotor having 2n rotor protrusions with an arc angle X°;

a stator having 2m stator protrusions with an arc angle Y° and m pairs of exciting coils, each of said exciting coils being disposed around one of said stator protrusions, the exciting coils in each of said pairs being spaced apart at 180° in mechanical angle; and a driver for sequentially energizing said exciting coils at intervals of 360°/(2n x q), wherein q≧5, X°, Y°>360°/(n×q), X°+Y°=180°/n−α°, where α° is a counter torque marginal angle which is larger than 0, and n and m are positive integers.

2. A q-phase reluctance type motor including a rotor having 2n rotor protrusions with an arc angle X°, a stator having 2m stator protrusions with an arc angle Y°, m pairs of exciting coils and a driver configured to sequentially energize said exciting coils in such a way that, at any given time, two adjacent pairs of said exciting coils are energized, wherein each of said pairs of exciting coils is disposed around one of said stator protrusions, the exciting coils in each of said pairs being spaced apart at 180° in mechanical angle, and q≧5, X°, Y°>360°/(n×q),

X°+Y°=180°/N×α°, where α° is a counter torque marginal angle which is larger than 0, and n and m are positive integers.

3. The reluctance type motor as claimed in claim 2, wherein at least one of said rotor protrusions and stator protrusions have a plurality of slits.

4. The reluctance type motor as claimed in claim 2, wherein each of said stator protrusions has a base portion that is wider than portions of said stator protrusions other than said base portion.

5. The reluctance type motor as claimed in claim 2, wherein,
said driver energizes said exciting coils at intervals of $360°/(2n\times q)$.

6. A method of driving a q-phase reluctance type motor including a rotor having 2n rotor protrusions with an arc angle $X°$, a stator having 2m stator protrusions with an arc angle $Y°$ and m pairs of exciting coils, wherein each of said pairs of exciting coils is disposed around one of said stator protrusions and the exciting coils in each of said pairs are spaced apart at 180° in mechanical angle, and wherein $q \geq 5$, $X°$, $Y° > 360°/(n \times q)$, $X°+Y°=180°/n-\alpha°$, where $\alpha°$ is a counter torque marginal angle which is larger than 0, and n is a positive integer, wherein
said exciting coils are energized at an angle not larger than $\alpha°$ in mechanical angle in advance of said rotor every $360°/(2n\times q)$ in mechanical angle.

\* \* \* \* \*

UNITED STATES PATENT AND TRADEMARK OFFICE
CERTIFICATE OF CORRECTION

PATENT NO. : 6,236,132 B1
DATED : May 22, 2001
INVENTOR(S) : Saito et al.

It is certified that error appears in the above-identified patent and that said Letters Patent is hereby corrected as shown below:

<u>Title page, item [73],</u>
Correct the name of the Assignee from "Denso Corporation, Kariya-city, Japan" to
-- Denso Corporation, Kariya-city, Japan & ASMO Co., Ltd., Kosai-city, Japan --.

Signed and Sealed this

Thirtieth Day of October, 2001

Attest:

*Nicholas P. Godici*

NICHOLAS P. GODICI
*Attesting Officer*    *Acting Director of the United States Patent and Trademark Office*